UNITED STATES PATENT OFFICE.

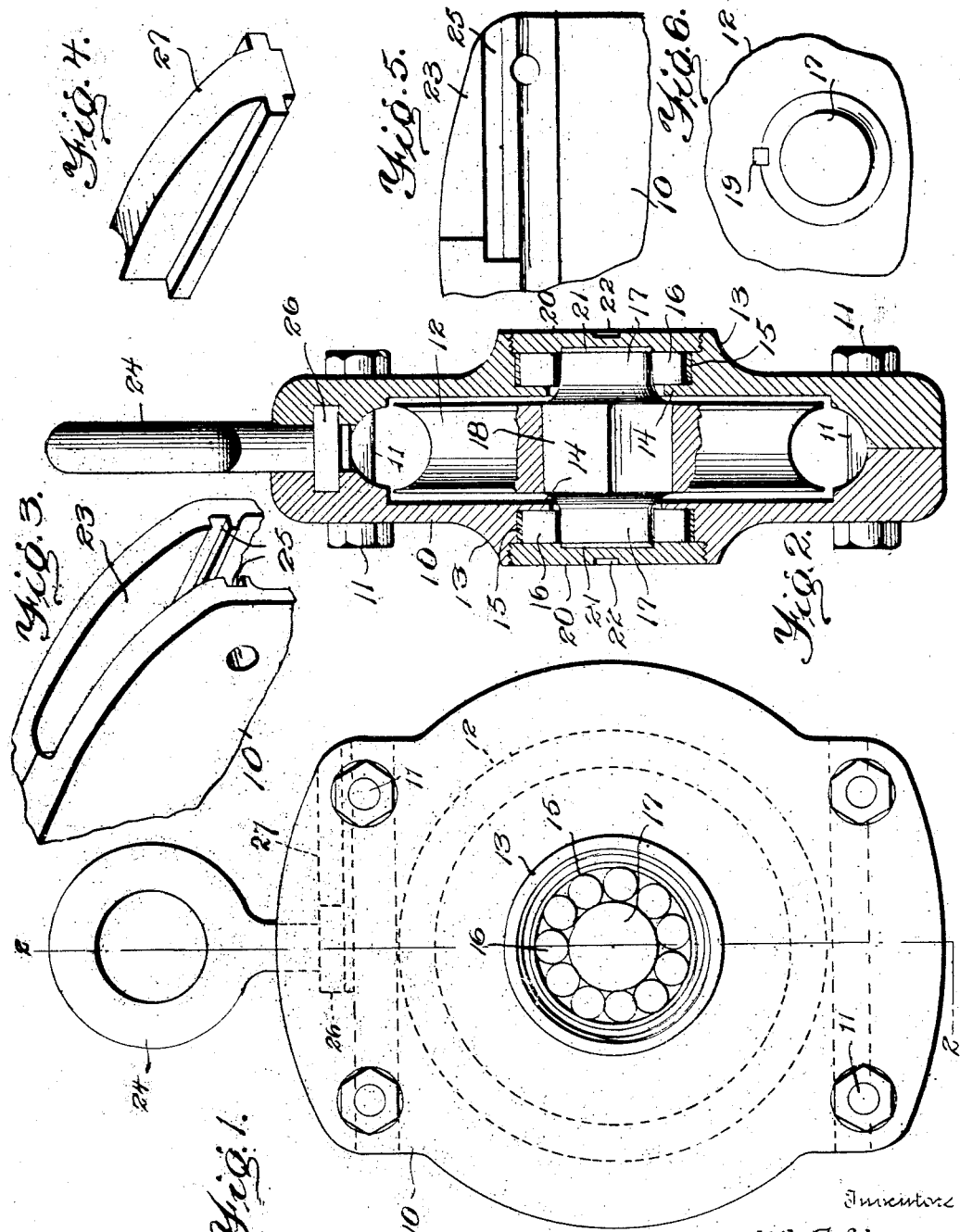

WILLIAM LUTHER FULTON, GEORGE JAMES SCRIMSHAW, AND WILLIAM McDANIEL SNYDER, OF SAVANNAH, GEORGIA.

WIRE-ROPE BLOCK.

1,034,437.  Specification of Letters Patent.  Patented Aug. 6, 1912.

Application filed July 11, 1911. Serial No. 638,037.

*To all whom it may concern:*

Be it known that we, WILLIAM L. FULTON, GEORGE J. SCRIMSHAW, and WILLIAM McD. SNYDER, citizens of the United States, residing at Savannah, in the county of Chatham and State of Georgia, have invented certain new and useful Improvements in Wire-Rope Blocks, of which the following is a specification.

This invention relates to improvements in blocks or sheave supports for ropes, more particularly for wire ropes, and has for one object to provide a simply constructed device of this character wherein provision is made for repairing and replacing broken or impaired parts without discarding the remaining portions of the device.

Another object of the invention is to provide a device of this character wherein provision is made for detaching the suspension means without removing the sheave or other parts.

Another object of the invention is to improve the construction and increase the efficiency and utility of devices of this character.

With these and other objects in view as will more fully appear as the description proceeds, the invention consists of certain novel constructions, arrangements and combinations of the parts that we shall hereinafter fully describe and claim.

For a full understanding of the invention, reference is to be had to the following description and accompanying drawing in which:

Figure 1 is a side elevation of the improved device; Fig. 2 is a section on the line 2—2 of Fig. 1; Fig. 3 is a perspective view of the upper portion of the casing; Fig. 4 is a perspective view of the filler strip detached; Fig. 5 is a detail view of a portion of one of the casing members; Fig. 6 is a detail illustrating a modification in the manner of securing the pin in the sheave.

Corresponding and like parts are referred to in the following description and indicated in all the views of the drawing by the same reference characters.

The improved device comprises in general a two-part casing represented conventionally at 10 united by clamp bolts 11 and supporting the rope sheave 12 between them. The casing members 10 are each provided with an outwardly projecting annular boss 13 and each boss reduced at the inner end to form an annular bearing shoulder 14. By this arrangement two outwardly opening bearings are produced centrally of the members 10, and the bearings thus produced are preferably lined with annular bushings 15. The bushings are preferably of case hardened steel and form bearings for a plurality of anti-friction rollers 16. The sheave 12 is provided with a central bearing pin having laterally projecting journals 17 for engaging the rollers, the pin being preferably rigidly connected in the sheave and revolving therewith. Any suitable means may be employed for securing the pin in the sheave, but the central portion of the pin will preferably be formed square and slightly tapered as represented at 18 and fitting in a correspondingly tapered aperture in the sheave. If preferred however, the pin may be secured in the sheave by an ordinary key 19 as represented in Fig. 6.

At its outer end each of the bosses 13 is internally threaded to receive a holding plate 20, and the center of each holding plate is cut out to receive a bearing plate 21 of brass or like metal or compound, against which the outer ends of the journals 17 of the pin bear to reduce the friction and prevent the parts from becoming abnormally heated. Each of the plates 20 is provided with a cavity 22 to receive a pin wrench to enable the plates to be inserted and removed. By this simple arrangement the sheave is supported for rotation against the anti-friction rollers 16, and the latter maintained in position by the shoulders 14 and the plates 20.

The confronting faces of the casing members 10 above the sheave 12 are cut away as shown at 23, the cutaway portions extending from one edge of the casing members 10 to a point slightly beyond the center as indicated in Figs. 1 and 5. Formed at the lower ends of the cutaway portions are grooves or channels 25, the channels opening inwardly, and the cutaway portions opening upwardly, as shown. The cutaway portions are designed to receive the shank member of an eye bolt 24, while the grooves 25 are designed to receive the head 26 of the eye bolt. By this arrangement it will be obvious that the eye bolt may be inserted from one side of the casing by simply inserting the head 26 in the inwardly opening channels 25 and the shank of the bolt in the cutaway portions 23. The cutaway portions and the channels, as before stated, extend to a point slightly beyond the center of the casings so that when the eye bolt is arranged in position, it will suspend the casing centrally of the same as shown. A filler strip 27 is provided for insertion into the channels 25 and the parts of the cutaway portion not occupied by the bolt. The channels 25 are so located that one of the apertures of one of the clamp bolts 11 cuts through the lower portions of the channels and the filler member 27 is provided with a notch to engage over the bolt and thus form a simple means for locking the filler block in position when the bolt is applied. By this simple arrangement it will be obvious that the eye bolt may be readily detached by simply releasing one of the bolts 11 and removing the filler block.

The improved device is simple in construction, can be manufactured of any required material and of any required size, and thus adapted to ropes of various sizes and dimensions, and may be employed in connection with ropes of any material, but is more particularly adapted for use in connection with wire ropes.

What we claim is:

1. In a rope block two body members engaging face to face, the confronting faces of the body members being cut away at the top and with channels in the cutaway portions, an eye bolt including a shank having a laterally enlarged terminal and engaging by the shank in the cutaway portions and by the head in the channels, and a filler member engaging in the cavities produced by the cutaway portions and in the channels, clamping means operating through said body members and a rope sheave mounted for rotation between said body members.

2. In a rope block two body members engaging face to face, the confronting faces of the body members being reduced to receive a cable sheave and cut away at the top at one side of the center and with channels in the cutaway portions, an eye bolt including a shank having a laterally enlarged terminal and engaging by the shank in the cutaway portions and by the head in the channels, a filler member engaging in the cavities produced by the cutaway portions and in the channels and with a transverse recess in its lower face, and clamping means operating through said body members and engaging in the recess of the filler member.

3. A rope block comprising two body members engaging face to face and with recesses in their confronting faces, said recesses having inwardly opening channels, a sheave mounted between said body members, a suspending member including a shank for entering said recesses and laterally enlarged to engage in said channels, a filler member fitting in the recesses and bearing against the suspending member and provided with ribs engaging in said channels, and clamping means operating through said body members.

4. A rope block supporting a cable sheave and having a lateral recess in its upper part with inwardly directed channels in the sides of the same, a suspending member including a shank to enter the recess and laterally enlarged to engage in the channels, a filler member fitting in the recess and bearing against the suspending member and provided with ribs engaging in said channels, and clamping means operating through said block.

In testimony whereof, we affix our signatures in presence of two witnesses.

WILLIAM LUTHER FULTON. [L. S.]
 GEORGE JAMES SCRIMSHAW. [L. S.]
 WILLIAM McDANIEL SNYDER. [L. S.]

Witnesses:
 N. J. Peters,
 M. J. Egan, Jr.